United States Patent [19]
Vatoux et al.

[11] Patent Number: 4,880,288
[45] Date of Patent: Nov. 14, 1989

[54] INTEGRATED OPTICAL WAVEGUIDE, METHOD FOR ITS MANUFACTURE, AND ITS USE IN AN ELECTRO-OPTICAL MODULATOR

[75] Inventors: Sylvie Vatoux, St Remy Les Chevreuses; Michel Papuchon, Massy; Hervé Lefevre, Paris, all of France

[73] Assignee: Thomson-CSF, Paris, France

[21] Appl. No.: 189,705

[22] Filed: May 3, 1988

[30] Foreign Application Priority Data

May 4, 1987 [FR] France ................. 87 06247

[51] Int. Cl.⁴ .................. G02B 6/10; H01L 21/265
[52] U.S. Cl. .................. 350/96.12; 350/96.13; 350/96.14; 350/320; 437/153; 437/154
[58] Field of Search ............ 350/96.11, 96.12, 96.13, 350/96.14, 96.15, 96.17, 320; 437/141, 144, 149, 153, 154, 157

[56] References Cited

U.S. PATENT DOCUMENTS

| | | | |
|---|---|---|---|
| 3,967,878 | 7/1976 | Caton | 350/96.15 X |
| 4,203,649 | 5/1980 | Velasco et al. | 350/96.14 |
| 4,391,486 | 7/1983 | Papuchon et al. | 350/96.14 |
| 4,400,052 | 8/1983 | Alferness et al. | 350/96.12 |
| 4,775,208 | 10/1988 | Robinson et al. | 350/96.14 |
| 4,799,750 | 1/1989 | Miyawaki | 350/96.13 |
| 4,818,063 | 4/1989 | Takizawa | 350/96.13 |

OTHER PUBLICATIONS

IEEE Transactions of Microwave Theory and Techniques, vol. MTT-30, No. 8, aout 1982, pp. 1121–1137, IEEE, New York, U.S.; R. C. Alferness "Waveguide Electrooptic Modulators", *FIGS. 3,10*.
Patent Abstracts of Japan, vol. 9. No. 9, (P-327)[1732], 16 janvier 1985 & JP-A-59 157 602 (Fujitsu K.K.) 07/09/1984.
Patent Abstracts of Japan, vol. 6, No. 171, (P-140)[1049], 4 septembre 1982; & JP-A-57 88 411 (Fujitsu K.K.) 02/06/82.
Journal of Optical Communications, vol. 6, No. 1, mars 1985, pp. 14–17, Mainz, DE: A. RASCH et al.: "Suppression of Outdiffusion in Ti:LiNbO3"*Chapitres 1–2*.
Journal of Optical Communication, vol. 1, No. 2, Novembre 190, pp. 64–73, Berlin, DE; J. Noda: "Ti-Diffused LiNbO3 Waveguides and Modulators", *Chapitre 4.1, lignes 1-fin*.

Primary Examiner—William L. Sikes
Assistant Examiner—Brian M. Healy
Attorney, Agent, or Firm—Oblon, Spivak, McClelland, Maier & Neustadt

[57] ABSTRACT

Disclosed is an integrated optical waveguide. This integrated optical waveguide is obtained by doping a lithium niobate monocrystal simultaneously or in two stages, by a titanium strip, in a manner known per se, to obtain a guiding zone for the optical wave, and by a titanium film of smaller thickness which covers the guiding zone and the lateral zones to preserve a waveguide in the guiding zone and improve the electro-optical behavior of the guide to which an electrical field is applied.

11 Claims, 3 Drawing Sheets

FIG_1a PRIOR ART
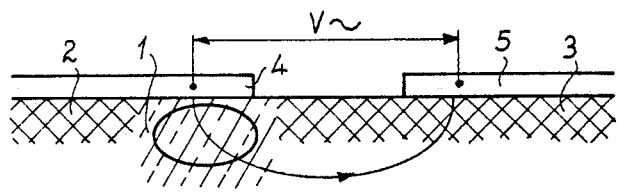
FIG_1b PRIOR ART
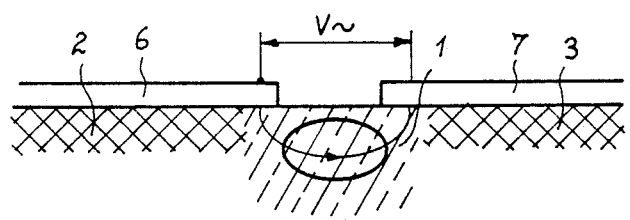
FIG_1c PRIOR ART
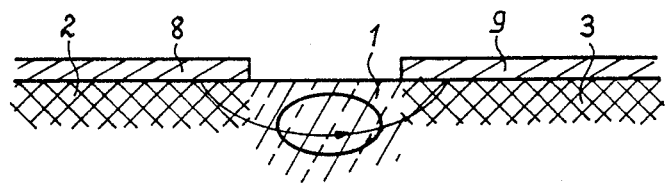
FIG_2
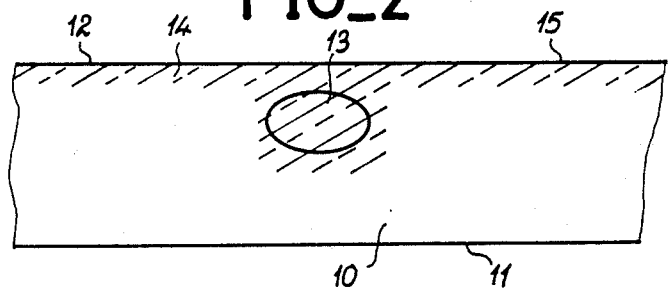

FIG_3
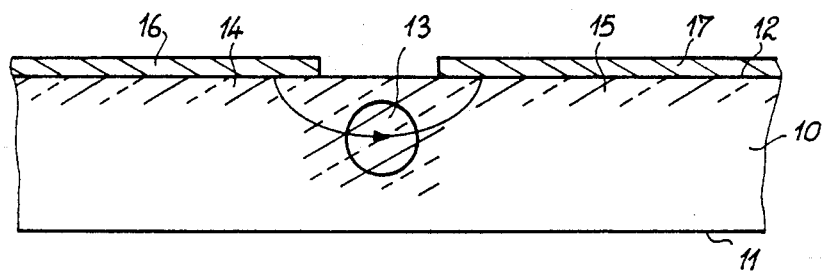
FIG_4
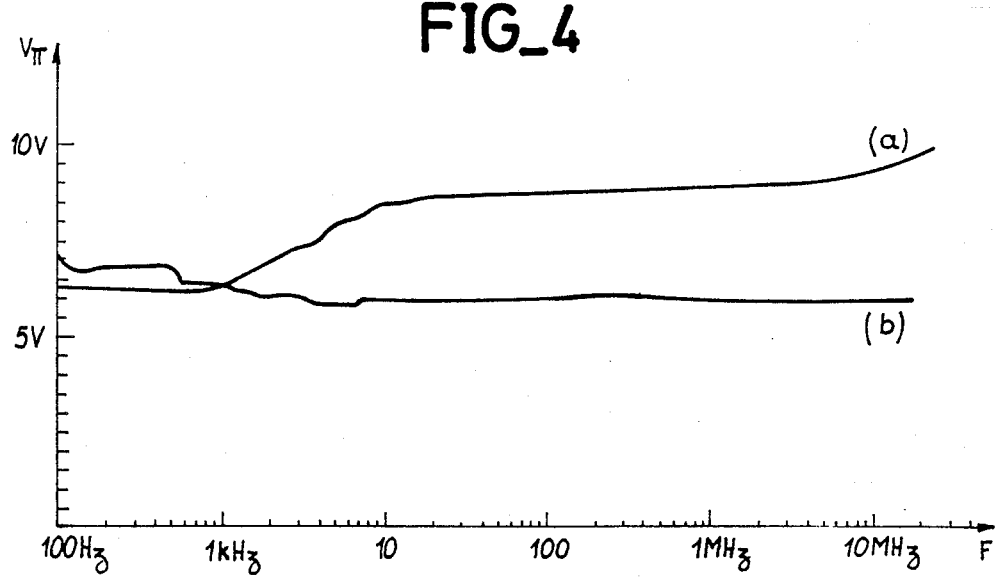
FIG_5
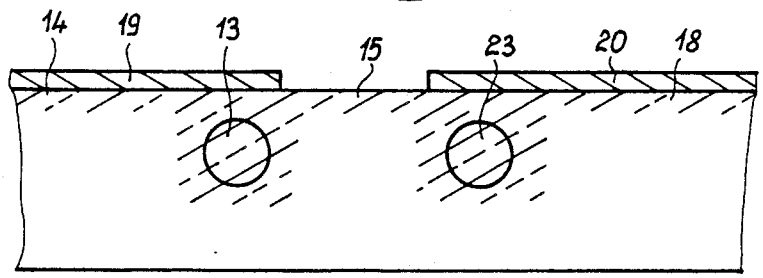

FIG_6
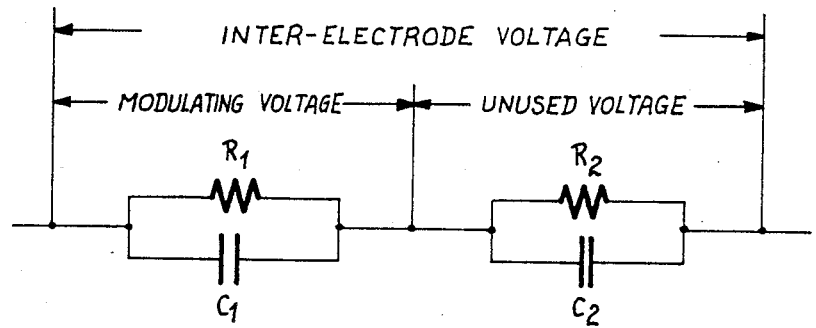

INTEGRATED OPTICAL WAVEGUIDE, METHOD FOR ITS MANUFACTURE, AND ITS USE IN AN ELECTRO-OPTICAL MODULATOR

BACKGROUND OF THE INVENTION

1. Field of the Invention

The invention relates to integrated optical waveguides with lateral confinement, the method of their manufacture and their use in integrated optics.

Optic waveguides are coming into increasing use not only for data transmission but also for data processing as they enable high-speed processing. This data processing aspect has given rise to what is called "integrated optics" technology relating to light propagation in dielectric waveguides made in planar shape on transparent substrates.

2. Description of the Prior Art

The standard way of making lateral confinement optical waveguides is to make them on a monocrystal lithium niobate surface by doping the crystal, generally with titanium introduced by thermal diffusion. The doped region has its refraction index increased and therefore becomes a guide for light in a certain range of wavelengths.

When guiding, with confinement in two dimensions, is desired, a titanium strip is diffused. This titanium strip has an identical pattern to the desired path of light. A doped region with an index greater than that of the substrate is obtained. This doped region is similar to an optical fiber core, with a guiding path of the desired geometry on the crystal surface.

Additional methods may be used, either to lower the refraction index on either side of the guide and prevent the formation of a guide with a uniform surface or to raise the index within the guiding zone, also according to a particular profile.

However, when titanium is diffused thermally in lithium niobate crystal, several effects may contribute to developing electrical charges on its surface:

the pyroelectrical effect which causes a flow of electrical charge to appear along an optical axis when the crystal is affected by a temperature variation;

the piezoelectrical effect or appearance of a voltage when mechanical deformation affects the crystal, for example during heat expansion.

These charges may be drained by the titanium strips to be diffused. But, in general, these strips have gaps ranging from a few microns to about ten microns. These gaps are due either to lithographic imperfections or to the pattern itself. In this case, instead of enabling the charges to be neutralized and therefore, the potential to become uniform, the strips may cause major differences in potential on either sides of their gaps. The very high local electrical field may then cause localized destruction of the crystal if dielectrical rigidity is inadequate. A splitting of the crystal is then observed. This causes a break in the guide and leads to additional propagation losses.

Furthermore, at the same time that the guide is made by diffusion of the titanium strip, an unwanted plane guide is created by the exodiffusion of lithium oxide during the thermal diffusion cycle.

Finally, an essential aspect of the value of waveguides of this type, made of lithium niobate, is that they exhibit Pockel's effect. This means that the propagation constant of the guided wave, i.e. the phase of the wave, can be modulated by applying a time-variable electrical field to the guide. Special configurations of guided circuits can be used for the amplitude modulation of light in amplitude to switch over light signals, perform signal processing functions, etc. The electrical field is applied by means of planar electrodes placed in such a way that the optical guide undergoes the desired variation in refraction index. For this, the position of the electrodes and the crystallographic orientation of the substrate are adapted to the desired functions.

However, it has been experimentally observed that the electrical field created between the electrodes inside the guide is not homogeneous, since the material crossed is anistropic and not homogeneous because of the thermal diffusion process used. With planar electrodes placed at the edges of the guide, in certain configurations, the field lines obtained go through the doped region and the non-doped region, and a relaxation phenomenon then comes into play if the material has regions with dielectrical constants and different resistivities. Furthermore, the distribution of electrical potentials between these two regions varies according to the frequency used. Consequently, the electrical field effectively applied to the guide varies with the frequency. This implies a variation in the efficiency of the apparent electro-optical modulation which comes into play at about 1 KHz and which can reach a factor of 1.5. This phenomenon is particularly harmful to low-frequency uses, for example, for the encoding of signals in underwater monitoring, or uses requiring a large band for signal processing in fiber gyrometry for example.

SUMMARY OF THE INVENTION

An object of the invention is a lateral confinement integrated optical waveguide with very substantially improved properties as regards both optical transmission and electro-optical and electrical behaviour. In particular, the integrated optical waveguide of the invention avoids the above-described disadvantages by uniformizing the electrical potential on the surface of the crystal during temperature rises, in reducing the phenomenon of lithium oxide exodiffusion, which creates an unwanted waveguide and in homogenizing the dielectrical properties of the material in the vicinity of the guide so as to obtain electro-optical modulation behaviour which is independent of the frequency of the applied electrical signal.

According to the invention, a lateral confinement integrated optical waveguide has a lithium niobate substrate with at least one central zone doped with an appropriate dopant, having a refractive index greater than that of the substrate and extending along the surface of the crystal according to the desired configuration, wherein this central zone is flanked by lateral zones doped with the same dopant, but in smaller concentrations, such that the guided wave can be propagated in the central zone.

Another object of the invention is a method to manufacture an integrated optical waveguide and its use, in particular, to make an electro-optical modulator, for example, a phase modulator or a switch.

BRIEF DESCRIPTION OF THE DRAWINGS

The invention will be better understood and other features will emerge from the following description made with reference to the appended drawings, of which:

FIGS. 1a, 1b and 1c show cross-section views of integrated electro-optical modulators according to the prior art;

FIG. 2 shows a cross-section view of an integrated optical waveguide according to the invention;

FIG. 3 shows a cross-section view of an electro-optical modulator according to the invention in one embodiment;

FIG. 4 is a graph showing curves of variations in the modulation voltage as a function of the frequency of this modulation voltage;

FIG. 5 shows a cross-section view of a COBRA type switch using the integrated optical guides of the invention;

FIG. 6 is an equivalent electrical diagram.

With these figures, the same elements are designated by the same references.

DESCRIPTION OF THE PREFERRED EMBODIMENTS

FIGS. 1a, 1b and 1c show structures of prior art electro-optical effect modulators. In FIG. 1a, the guide zone 1, obtained by doping with titanium, is flanked by two non-doped lateral zones, 2 and 3.

In FIG. 1a, an electrode 4 covers one side zone and the guiding zone, while another electrode 5 is placed only on the other side zone. In this case, when an electrical field is applied between the two electrodes 4 and 5, the field lines cross non-homogeneous zones.

In FIG. 1b, electrodes 6 and 7 are placed on either side of the guide and partially cover the doped zone. In this case, the electrical field lines cross a homogeneous zone of homogeneous material.

In FIG. 1c, the electrodes 8 and 9 cover only the non-doped side zones of the guide. In this case, as in the case of FIG. 1, the field lines cross non-homogeneous zones of material.

During the thermal diffusion process, as indicated above an unwanted phenomenon is created by the exodiffusion of lithium oxide, which tends to create a waveguide with a uniform surface, shown in the gridded portions of FIGS. 1a, 1b and 1c, confined perpendicularly to the surface.

Furthermore, as also indicated above, the thermal diffusion of the titanium in the lithium niobate crystal tends to develop electrical charges on the surface, and these electrical charges may be drained by the titanium strips. However, these strips have gaps and, hence, major differences in potential are created on either side of the gaps, so that a splitting of the crystal is observed. This splitting of the crystal causes a break in the guide, leading to additional propagation losses.

Finally, since the field lines cross the doped region and non-doped region, especially in the examples shown in FIGS. 1a and 1c, the distribution of electrical potentials between the two regions varies according to the frequency used. Consequently, the electrical field applied to the guide varies with the frequency.

According to the present invention, an optical waveguide such as the one shown in FIG. 2 is formed in a lithium substrate 10 with a thickness and width of a few millimeters, and a length which may vary from one millimeter to a few tens of millimeters. This substrate 10 has an under surface 11 by which it can be held on a support (not shown) and a top surface 12. On this top surface 12, the substrate 10 has longitudinal central zones, such as 13, and longitudinal lateral zones adjacent to these central zones, such as 14 and 15, which are all doped with titanium but in concentrations that differ depending on whether they are in the central zone or the lateral zones. Furthermore, their thicknesses are different.

The concentration characteristics and dimensions are, for example, as follows:

ratio of concentration levels:

$$R = \frac{\text{titanium concentration (zone 14 or 25)}}{\text{titanium concentration (zone 13)}} = 10\%$$

depth of zones, 13, 14, 15: a few microns thickness of titanium layer in zone 13 before diffusion: 500Å to 900Å.

width of titanium strip in zone 13: 3 to 7 microns.

diffusion temperature: 1000° C.

diffusion time: 6h.

These characteristics show that the titanium concentration of the lateral zones, 14 and 15, is much lower than that of the central zone 13. The purpose of this is to enable optical guiding in the central zone.

Through the effect of titanium doping, the central zone has a refraction index which is slightly greater, by a few thousandths per cent to one per cent, than the refraction index of the substrate 10. It is equal, for example, to 2.205 while refraction index of the substrate is equal to 2.200 for an optical wavelength of 0.85 μm: thus, an optical waveguide is obtained.

FIG. 3 shows a cross-section of a waveguide similar to the one shown in FIG. 2 which has been provided with electrodes to perform an electro-optical modulation function, for example, a phase modulation.

The top surface 12 supports two metallic electrodes 16 and 17, made of gold for example, which are in direct contact with the said surface as shown in the figure, or are separated by a thin dielectrcal buffer (not shown). These electrodes 16 and 17 are placed parallel to the edges of the central zone 13 and may partially cover it, but the greater part of the zone, subjacent to these electrodes, consists of a part of the lateral zones 14 and 15. The dimensions of these electrodes are the following for example:

interelectrode space: 6 μm.

width of electrodes: 50 μm.

thickness of electrodes: 0.2 μm.

The electrodes 16 and 17 are connected to an external voltage source by wires, made of gold for example, not shown in FIG. 3.

This type of structure of an electro-optical modulator gives a control voltage/frequency response curve, with constant electro-optical effect, that is almost flat as a function of frequency up to 10 MHz as shown in the curve (b) of FIG. 2. The response curve (a) shown in the same graph is the one obtained with a modulator using a guide formed with only one central titanium doped zone, as shown in FIG. 1c for example: this curve (a) shows a variation in the efficiency of the apparent electro-optical modulation around one KHz, the control voltage varying between about 6.5 V and about 9.5 V, i.e. in a ratio of about 1.5.

FIG. 5 shows a cross-section of a COBRA type switch with two guides, 13 and 23, like the guide shown in FIG. 2. Two electrodes 19 and 22 almost entirely cover the guide zones, and the radiation transmitted in one of the guides can be transferred to the other guide, upon control of the voltage applied between the electrodes.

To manufacture a guide of the type described with reference to FIG. 2, it is possible to implement either of two alternative manufacturing methods. The initial steps of these two alternatve methods are the same as those of the prior art, up to the step for doping the substrate with titanium. However, according to the invention, what is done is not only the diffusion of one titanium strip, with the waveguide then being formed in the zone of the substrate that has thus been doped, but also the diffusion of a titanium film on the entire surface of the substrate. The conditions of diffusion and the thickness of the uniform titanium film are chosen so that the uniform doping produced on the surface enables the propagation of a guided wave in the central zone of the strip.

More precisely, on a lithium niobate substrate that is 20 millimeters long for example, a photo-etching process is used to make a titanium strip on the top surface of the substrate with a thickness of about 300 angstroms and a width of about 3 $\mu$m. To diffuse the titanium strip, the substrate is then placed in a furnace, where it is subjected to a first heating cycle with the following characteristics:

temperature rise: 2 hours
temperature plateau: 980° C.
duration of temperature plateau: 4 hours
temperature fall : 6 hours
oxygen flow of 1.5 L/minute: throughout the duration of the cycle.

By this cycle, the thermal diffusion of the titanium strip is done in the subjacent zone of the substrate and a 0.8 micron wavelength monomode waveguide is obtained.

Then, a titanium film, about 50 angstroms thick, is deposited on the entire top surface of the substrate, for example by radio-frequency sputtering. To diffuse the titanium film, the substrate is again placed in a furnace where it is put through a second heating cycle with the following characteristics:

temperature rise: 2 hours
temperature plateau: 980° C.
duration of temperature plateau: 2 hours
temperature fall : 6 hours
oxygen flow of 1.5 L/minute: throughout the duration of the cycle.

The waveguide is now completed.

Electrodes can then be made by cathode sputtering of gold on the top surface of the substrate, in the configuration needed to obtain the desired electro-optical modulation function. This final step gives, for example, the phase modulator or optical switch structures shown in FIGS. 3 and 5.

The second alternative method is such that the titanium film which has to cover the entire top surface of the substrate is deposited just after the depositing of the titanium strip, the thermal diffusion of which will give the optical waveguide. The titanium strip and titanium film are then simultaneously diffused thermally in the substrate. The two heating cycles are then replaced by a single cycle, the characteristics of which are the same as the first heating cycle of the first alternative method. Thus, a simultaneous thermal diffusion of the titanium strip and the titanium film is obtained.

The electrodes can then be deposited according to the desired configurations as indicated above.

Of course, the two alternative manufacturing methods described above can be organized without going beyond the scope of the present invention. The important aspect of these methods is diffusion, on at least a major part of the substrate surface and, necessarily, in the vicinity of the guiding zones, of a titanium film of smaller thickness than the titanium strip that gives rise to the guide, so as to obtain titanium doping that is far less than in the zone of the optical waveguide, on either side of the guided zone.

The second alternative method has advantages as compared with the first one. To begin with, the presence of a titanium film on the surface of the top side of the substrate during the heating cycle creates uniformity in the electrical potential at the surface during the rise in temperature. For, the electrical charges caused by pyroelectrical effect and piezoelectrical effect are drained by the titanium film, thus preventing the accumulation of these charges in certain gaps, especially when the titanium strip has gaps of a few microns due either to lithographic imperfections or to the pattern itself.

A second advantage of the second alternative method is obviously a gain in time and power, which means a lower cost price because there is only one heating cycle.

One advantage common to both alternative methods, apparently due to the diffusion of the titanium film covering the entire top surface of the substrate, is reduced exodiffusion of lithium oxide, during the heating cycle, which creates an unwanted plane guide at the edges of the central waveguide.

The advantages resulting from the obtained structure consist mainly in the homogenizing of the dielectrical properties, especially the dielectrical constant and resistivity, of the material in the vicinity of the guide, because the force lines of the electrical field, applied by a guide through electrodes, cross only doped zones.

The electrical diagram of FIG. 6 shows that the electro-optical modulator is equivalent to two series-connected resistor/capacitor circuits to which the interelectrode voltage is applied. For example, the guide is represented by the resistor R1 in parallel with the capacitor C1, at the terminals of which appears the modulating voltage, while the substrate is represented by the resistor R2 in parallel with the capacitor C2, at the terminals of which is the unused voltage. In prior art electro-optical modulators, in which the electrical field lines cross a doped zone and a non-doped zone, the values of R1 and C1 are very different from those of R2 and C2 because of this disymmetry between the zones. By homogenizing these two zones through titanium doping, this disymmetry between values is attenuated, and steady electrical behaviour is obtained in a large frequency band.

What is claimed is:

1. A lateral confinement integrated optical waveguide comprising:
   a lithium niobate substrate with at least one central zone, a dopant material formed as a strip for doping said substrate with an appropriate dopant having a refractive index greater than that of the substrate and such that said strip extends along the surface of the crystal according to the desired configuration,
   a film of dopant material placed such that it flanks said central zone by lateral zones so that these lateral zones are doped with the same dopant as the desired configuration but in smaller concentrations, such that a guided wave can be propagated in the central zone.

2. A waveguide according to claim 1 wherein the dopant is titanium.

3. A waveguide according to either of the claims 1 or 2 wherein the entire surface of the substrate is doped.

4. A waveguide according to claim 1 wherein the depth of the central zone is at least equal to that of the lateral zones.

5. A method for manufacturing a waveguide comprising:

the steps of forming a lithium niobate substrate, with at least one central zone;

doping with an appropriate dopant having a reflective index greater than that of the substrate, on said substrate, and wherein said dopant extends along the surface of the crystal according to a desired configuration and wherein a central zone is obtained by diffusion of a strip of dopant deposited on the surface of the substrate and wherein lateral zones are obtained by diffusing a film of dopant with a smaller thickness than that of the strip and in a smaller concentration, such that guided waves are propagated in said central zone.

6. A method according to claim 5 wherein the film of dopant is deposited after the strip throughout the surface of the substrate.

7. A method according to either of the claims 5 or 6, wherein the strip and the film of dopant are deposited successively and then diffused by thermal diffusion simultaneously in a single heating and cooling cycle.

8. A method according to either of the claims 5 or 6 wherein the strip is deposited and then diffused by thermal diffusion during a first heating and cooling cycle and wherein the film is then deposited and then diffused by thermal diffusion during a second heating and cooling cycle.

9. An electro-optical modulator using at least one integrated optical waveguide according to claim 1 further comprising planar electrodes deposited on the surface of the thus doped substrate, extending along the central zone.

10. A modulator according to claim 9 wherein, for a phase modulator, the electrodes extend on the lateral zones on either side of the guiding zone.

11. A modulator according to claim 9 wherein, for an electro-optical switch, the substrate comprises two adjacent waveguides, having a common lateral zone and two extreme lateral zones, and wherein the electrodes respectively cover a central zone and the contiguous extreme lateral zone.

* * * * *